(12) United States Patent
Debski

(10) Patent No.: US 9,464,928 B2
(45) Date of Patent: Oct. 11, 2016

(54) HOLDER FOR A LIQUID

(75) Inventor: Edward Hendrik Debski, Enschede (NL)

(73) Assignee: Bark Innovations B.V., Eerbeek (NL)

( * ) Notice: Subject to any disclaimer, the term of this patent is extended or adjusted under 35 U.S.C. 154(b) by 0 days.

(21) Appl. No.: 14/343,172

(22) PCT Filed: Jun. 12, 2012

(86) PCT No.: PCT/NL2012/050408
§ 371 (c)(1),
(2), (4) Date: Mar. 6, 2014

(87) PCT Pub. No.: WO2013/039381
PCT Pub. Date: Mar. 21, 2013

(65) Prior Publication Data
US 2014/0197209 A1    Jul. 17, 2014

(30) Foreign Application Priority Data

Sep. 15, 2011   (NL) ..................... 2007421

(51) Int. Cl.
*G01F 11/26* (2006.01)
*G01F 11/32* (2006.01)
*B65D 25/52* (2006.01)

(52) U.S. Cl.
CPC ............. *G01F 11/32* (2013.01); *B65D 25/52* (2013.01); *G01F 11/263* (2013.01)

(58) Field of Classification Search
CPC ............. G01F 11/32; G01F 11/261–11/263; G01F 11/082; G01F 11/26; G01F 11/268; B65D 25/44; B65D 25/22

USPC .......... 222/424, 424.5, 434, 438, 439, 441, 222/446, 450–454, 456; 141/322
See application file for complete search history.

(56) References Cited

U.S. PATENT DOCUMENTS

|  |  |  |  |  |
|---|---|---|---|---|
| 80,852 | A * | 8/1868 | Blake et al. | 224/442 |
| 236,997 | A * | 1/1881 | Dodge | 222/456 |
| 345,112 | A * | 7/1886 | Canan | 222/450 |
| 391,967 | A * | 10/1888 | Hennig | 141/322 |
| 442,088 | A * | 12/1890 | Herrick | 222/444 |
| 476,470 | A * | 6/1892 | Leslie | 141/322 |
| 564,209 | A * | 7/1896 | Meins | 222/445 |
| 570,671 | A * | 11/1896 | Long | 222/449 |
| 570,759 | A * | 11/1896 | Law | 222/456 |
| 820,679 | A * | 5/1906 | Studley | 141/322 |

(Continued)

FOREIGN PATENT DOCUMENTS

| DE | 19742464 A1 | 4/1999 |
|---|---|---|
| EP | 0202406 A2 | 11/1986 |

(Continued)

*Primary Examiner* — Patrick M Buechner
*Assistant Examiner* — Randall Gruby
(74) *Attorney, Agent, or Firm* — The Webb Law Firm

(57) ABSTRACT

Disclosed is a holder for holding a liquid, which includes a supply chamber with a bottom surface, a peripheral wall standing from the peripheral edge of the bottom surface and a closing upper surface, wherein a passage opening is arranged close to or in the upper surface; a dosing chamber arranged on the passage opening of the supply chamber, wherein the dosing chamber further comprises a pouring opening for pouring the liquid out of the dosing chamber; and a closure for closing either the pouring opening or the passage opening as desired. At least a part of the dosing chamber extends below the level of the passage opening.

6 Claims, 5 Drawing Sheets

(56) References Cited

U.S. PATENT DOCUMENTS

| | | | | |
|---|---|---|---|---|
| 1,066,127 A * | 7/1913 | Lewis | | 222/455 |
| 1,199,507 A * | 9/1916 | Strauss | | 222/455 |
| 1,260,334 A * | 3/1918 | Cordely | | 222/453 |
| 1,270,262 A * | 6/1918 | Buckland | | 222/437 |
| 1,555,591 A * | 9/1925 | Larrison | | 222/450 |
| 1,671,542 A * | 5/1928 | Perks | | 222/440 |
| 1,792,464 A * | 2/1931 | Miller | | 141/18 |
| 2,038,418 A * | 4/1936 | Conner | | 222/446 |
| 2,133,679 A * | 10/1938 | Woeltjen | | 222/442 |
| 2,243,452 A * | 5/1941 | Bickel et al. | | 222/455 |
| 2,331,659 A * | 10/1943 | Cutone | | 222/445 |
| 2,403,299 A * | 7/1946 | Pickin | | 222/318 |
| 2,475,720 A * | 7/1949 | Preston | | 222/456 |
| 2,760,692 A * | 8/1956 | Buehlig | | 222/434 |
| 2,828,893 A * | 4/1958 | Stewart et al. | | 222/453 |
| 2,853,213 A * | 9/1958 | Buehlig | | 222/455 |
| 2,864,538 A * | 12/1958 | Rasmussen | | 222/453 |
| 2,889,966 A * | 6/1959 | Burt | | 222/445 |
| 2,977,028 A * | 3/1961 | Joffe | | 222/442 |
| 2,980,302 A * | 4/1961 | Rasmussen | | 222/453 |
| 3,232,498 A * | 2/1966 | Bennett | | 222/449 |
| 3,235,143 A * | 2/1966 | Goodrich | | 222/454 |
| 3,237,816 A * | 3/1966 | Anderson | | 222/450 |
| 3,353,725 A * | 11/1967 | Caceres | | 222/456 |
| 3,844,454 A * | 10/1974 | Buchtel | | 222/453 |
| 3,894,661 A * | 7/1975 | Guala | | 222/188 |
| 4,079,859 A * | 3/1978 | Jennings | | 222/1 |
| 4,151,934 A * | 5/1979 | Saeki | | 222/437 |
| 4,298,038 A * | 11/1981 | Jennings | | 141/2 |
| 4,323,179 A * | 4/1982 | Crespi | | 222/449 |
| 4,684,046 A * | 8/1987 | Foster et al. | | 222/451 |
| 4,690,313 A * | 9/1987 | Luine et al. | | 222/454 |
| 4,778,087 A * | 10/1988 | Desai | | 222/449 |
| 4,807,785 A * | 2/1989 | Pritchett | | 222/442 |
| 4,821,930 A * | 4/1989 | Luine et al. | | 222/454 |
| 4,830,226 A | 5/1989 | Kong | | |
| 4,886,193 A * | 12/1989 | Wassilieff | | 222/446 |
| 4,893,732 A * | 1/1990 | Jennings | | 222/109 |
| 4,951,839 A * | 8/1990 | Kong | | 222/47 |
| 5,000,353 A * | 3/1991 | Kostanecki et al. | | 222/207 |
| 5,029,736 A * | 7/1991 | Maruyama et al. | | 222/455 |
| 5,078,305 A * | 1/1992 | Glynn et al. | | 222/442 |
| 5,092,497 A * | 3/1992 | Toedter | | 222/434 |
| 5,119,971 A * | 6/1992 | Reyman | | 222/129 |
| 5,165,576 A * | 11/1992 | Hickerson | | 222/158 |
| 5,356,053 A * | 10/1994 | Di Fatta | | 222/456 |
| 5,392,966 A * | 2/1995 | Bunin | | 222/454 |
| 5,480,071 A * | 1/1996 | Santagiuliana | | 222/455 |
| 5,495,964 A * | 3/1996 | Santagiuliana | | 222/455 |
| 5,518,152 A | 5/1996 | Burcham et al. | | |
| 5,556,011 A * | 9/1996 | Jennings et al. | | 222/455 |
| 5,695,093 A * | 12/1997 | Lucius | | 222/129 |
| 5,909,824 A * | 6/1999 | Qian et al. | | 222/1 |
| 5,971,216 A | 10/1999 | Robbins, III | | |
| 6,068,165 A * | 5/2000 | Minihane et al. | | 222/454 |
| 6,227,418 B1 * | 5/2001 | Loertscher | | 222/438 |
| 6,357,627 B1 * | 3/2002 | Pasbrig et al. | | 222/81 |
| 6,547,105 B1 * | 4/2003 | Seelhofer et al. | | 222/205 |
| 6,923,344 B1 * | 8/2005 | Chien | | 222/158 |
| 7,490,719 B2 * | 2/2009 | Parker | | 206/219 |
| D677,571 S * | 3/2013 | Jennings et al. | | D9/523 |
| 2003/0146246 A1 | 8/2003 | Arsenault et al. | | 222/453 |
| 2012/0132677 A1 * | 5/2012 | Hall | | 222/454 |
| 2012/0248153 A1 * | 10/2012 | Peng | | G01F 11/262 222/454 |
| 2013/0240573 A1* | 9/2013 | Debski | | G01F 11/262 222/438 |
| 2014/0008398 A1* | 1/2014 | Law | | G01F 11/263 222/477 |
| 2015/0060498 A1* | 3/2015 | Moreau | | G01F 11/263 222/454 |
| 2015/0232259 A1* | 8/2015 | Regard | | G01F 11/32 222/402.2 |

FOREIGN PATENT DOCUMENTS

| | | |
|---|---|---|
| EP | 2243721 A1 | 10/2010 |
| FR | 2580259 A1 | 10/1986 |

* cited by examiner

HOLDER FOR A LIQUID

CROSS-REFERENCE TO RELATED APPLICATIONS

This application is the United States national phase of International Application No. PCT/NL2012/050408 filed Jun. 12, 2012, and claims priority to The Netherlands Patent Application No. 2007421 filed Sep. 15, 2011, the disclosures of which are hereby incorporated in their entirety by reference.

BACKGROUND OF THE INVENTION

1. Field of the Invention

The invention relates to a holder, such as a plastic container, jerrycan or the like, for holding a liquid, the holder including a supply chamber with a bottom surface, a peripheral wall standing from the peripheral edge of the bottom surface and a closing upper surface, wherein a passage opening is arranged close to or in the upper surface; a dosing chamber arranged on the passage opening of the supply chamber, wherein the dosing chamber further comprises a pouring opening for pouring the liquid out of the dosing chamber; and a closure for closing either the pouring opening or the passage opening as desired.

2. Description of Related Art

Such a holder is known from DE 19742464. Described in this publication is a holder with a supply chamber having a dosing chamber on the top thereof. The holder is further provided with a closure with which either the passage from the supply chamber to the dosing chamber or the pouring opening of the holder can be closed.

Because the dosing chamber is arranged on top of the supply chamber, the holder has to be inverted in order to fill the dosing chamber with liquid. However, as soon as the holder is placed upright again the dosing chamber empties again. According to this publication this emptying is slowed by providing a small passage, so that following the upright placing the user can operate the closure quickly in order to close the passage between supply chamber and dosing chamber.

The quantity of liquid in the dosing chamber will hereby not always be the desired quantity. In addition, some skill is required to perform the successive actions sufficiently quickly.

U.S. Pat. No. 4,830,226 describes a holder for liquid with a supply chamber and a dosing chamber arranged thereon. According to this publication, the dosing chamber can be filled via a riser pipe in the supply chamber or by wholly inverting the holder. In this latter variant liquid will however flow partially back again from the dosing chamber into the supply chamber. The quantity of liquid which flows back depends on the speed with which the holder is turned over again.

Known prior art holders having the option of also enabling dosage are often greatly dependent on the competence of the user. The dispensing amount is influenced by holding the container in a determined position or by squeezing or pressing the container, whereby the amount to be dosed is not constant. In order to solve this problem separate components, such as measuring cups and the like, are often supplied in order to enable better dosage. These components must however be cleaned after use and more product than necessary (residual quantity) hereby enters the environment. The correctness of the dosage greatly depends here on the dexterity of the user.

SUMMARY OF THE INVENTION

The object of the invention is to reduce or even obviate the above stated drawbacks.

This object is achieved according to the invention with a holder in which at least a part of the dosing chamber extends below the level of the passage opening.

By having a part of the dosing chamber extend below the level of the passage opening the dosing chamber can be provided with liquid by means of a pouring movement of the holder. It is therefore not necessary to turn the holder completely upside down and operate the closure quickly in order to prevent flow of liquid out of the dosing chamber.

In a preferred embodiment of the holder according to the invention the dosing chamber extends on the outer side of the supply chamber along at least a part of the peripheral wall.

Arranging the dosing chamber on the outer side enables a visual indication to be easily given as to whether the dosing chamber already contains liquid.

The dosing chamber is preferably further arranged eccentrically relative to the passage opening. This simplifies filling of the dosing chamber from the supply chamber. Nor will liquid be able to flow out of the eccentrically placed dosing chamber when the holder is moved back to the upright position.

In another embodiment of the holder according to the invention the closure comprises a valve for closing the passage opening. The valve can be carried into the passage opening in order to thereby close the opening and, during pouring of the quantity of dosed liquid, prevent liquid also flowing out of the supply chamber.

In yet another embodiment of the holder according to the invention the closure has a closing cap arranged on the pouring opening, wherein the cap is coupled to the valve.

The pouring opening can be closed with the closing cap. Owing to the coupling to the valve, this valve is moved automatically to the closing position when the cap is removed. When the cap is re-placed, whereby the pouring opening is closed, the valve is once again operated such that the passage opening is left clear.

In a preferred embodiment of the holder according to the invention the closure comprises a coupling for effecting a coupling between the cap and the valve during sealing of the pouring opening with the cap.

This coupling makes it possible to wholly remove the cap from the holder, while the valve is left in place and closes the passage opening.

In yet another preferred embodiment of the holder according to the invention the closure comprises a housing extending between the passage opening and the pouring opening, wherein the housing wall is perforated.

Such a housing for the closure enables a simple assembly. The holder can for instance be formed by a blow moulding technique, after which the closure with housing is placed via the pouring opening into the passage opening.

The cap for the holder according to the invention is preferably a screw cap. It is hereby possible to apply already known childproof closures.

BRIEF DESCRIPTION OF THE DRAWINGS

These and other features of the invention are further elucidated with reference to the accompanying drawings.

DESCRIPTION OF THE INVENTION

Figure 1:
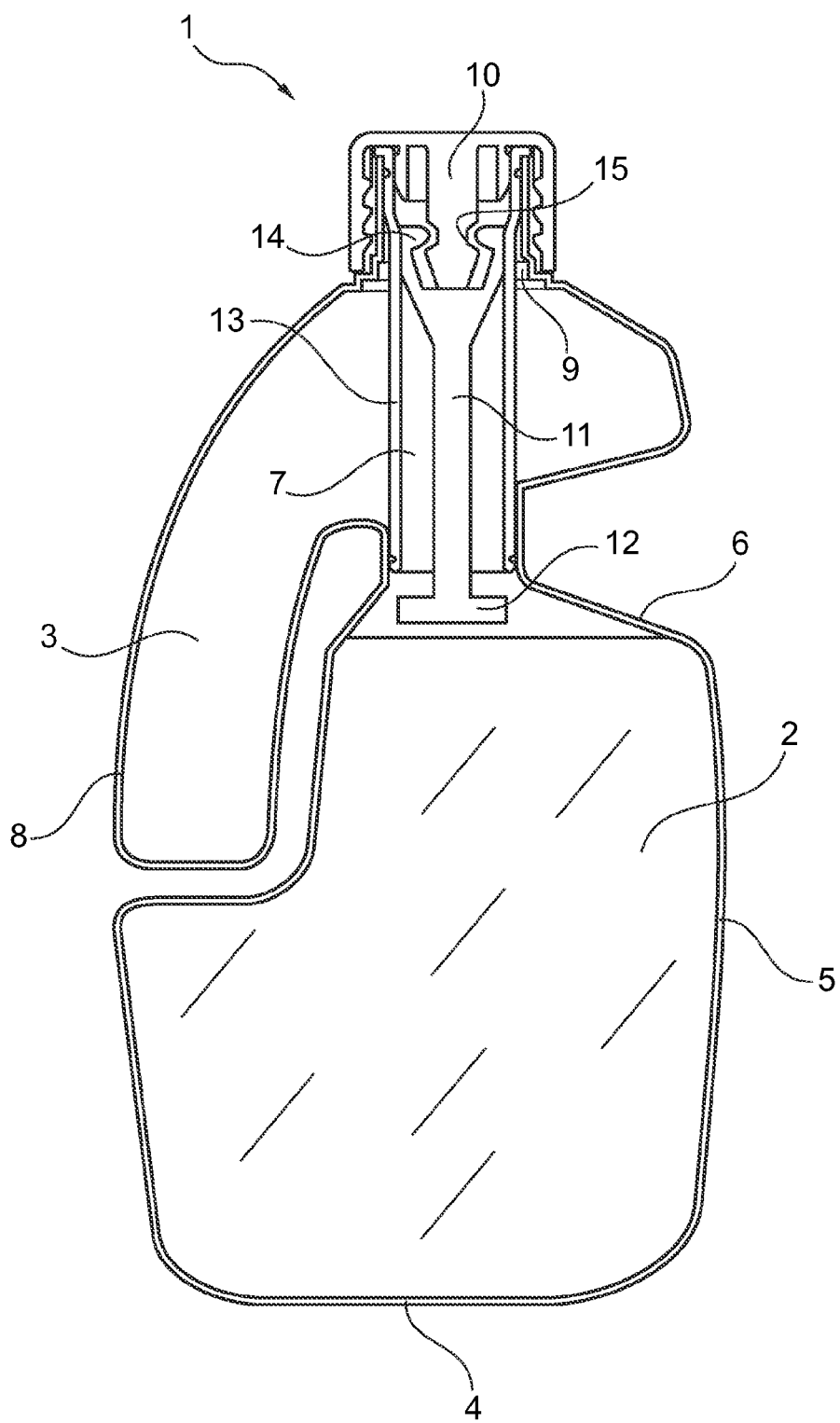
FIG. 1 shows a cross-sectional view of a first embodiment of a holder according to the invention in a rest position.

FIG. 1 shows a cross-sectional view of a first embodiment of a holder 1 according to the invention. Holder 1 has a supply chamber 2 and a dosing chamber 3. Supply chamber 2 has a bottom surface 4 with an upright peripheral wall 5 and an upper surface 6 in which a passage opening 7 is arranged.

Dosing chamber 3 is arranged on passage opening 7. A part 8 of dosing chamber 3 lies under the level of passage opening 7. Further provided on the upper side of dosing chamber 3 is a closable pouring opening 9 which is closed with a screw cap 10.

Arranged between pouring opening 9 and passage opening 7 is a cylindrical housing 13 which will be further elucidated below. Screw cap 10 is connected via an elongate coupling element 11 to a valve 12 which in the shown position leaves passage opening 7 clear. Cap 10 is connected to coupling element 11 via fingers 14 which, owing to the narrowed portion in cylindrical housing 13, are pressed into groove 15 of cap 10.

Figure 2:
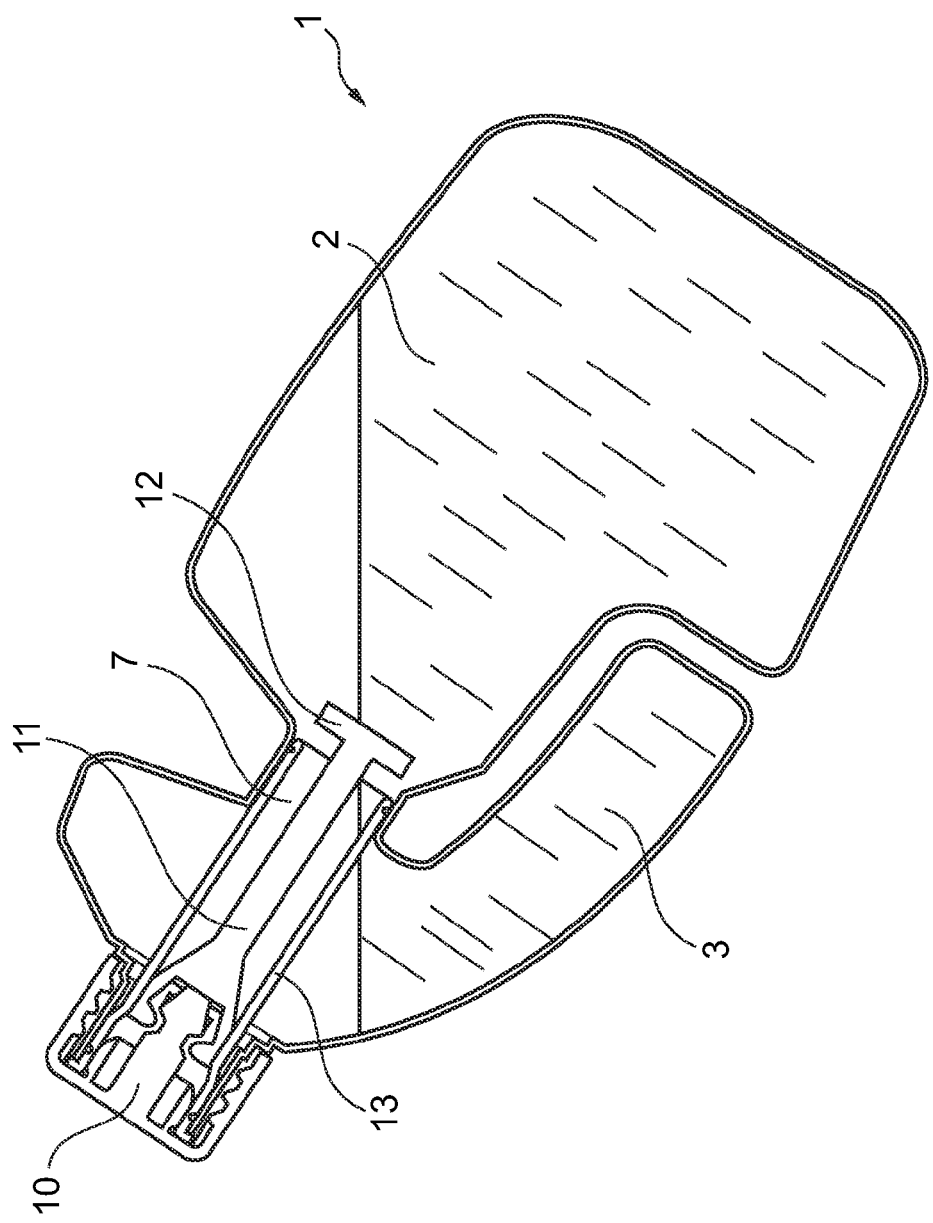
FIG. 2 shows a cross-sectional view of the embodiment of the holder of FIG. 1 in the dosing position.

Holder 1 according to FIG. 1 is shown in a dosing position in FIG. 2. A pouring movement is made here with the holder, whereby liquid can flow out of supply chamber 2 via passage opening 7 into dosing chamber 3. Screw cap 10 is screwed onto holder 1 here in order to close pouring opening 9, and valve 12 leaves passage opening 7 clear.

Figure 3:
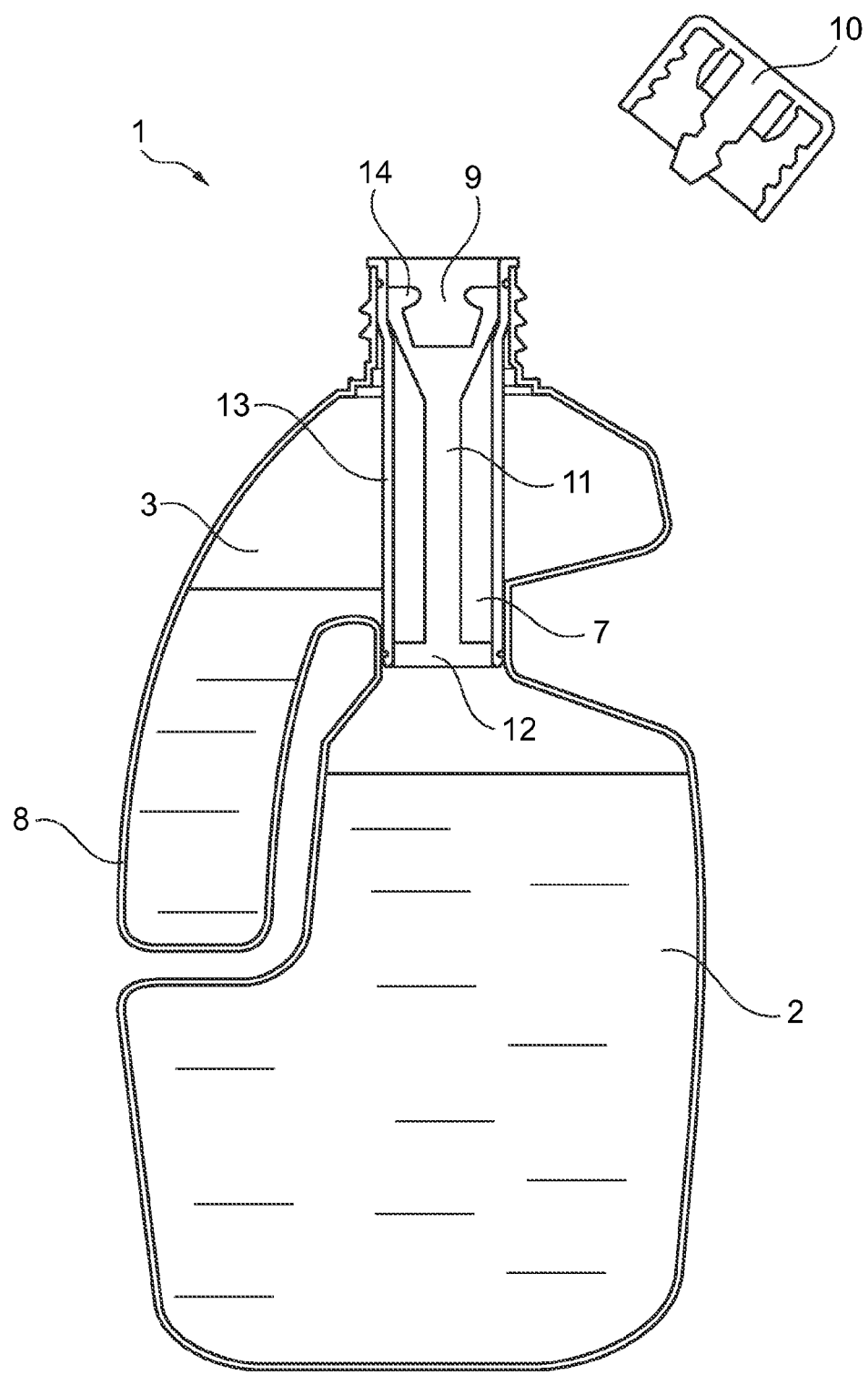
FIG. 3 shows a cross-sectional view of the embodiment of the holder of FIG. 1 in the rest position with opened pouring opening.

In FIG. 3 holder 1 has been tilted back from the dosing position as shown in FIG. 2. Liquid is hereby left behind in the part of the dosing chamber 3 lying below the level of passage opening 7. As seen in FIGS. 1-3, the housing 13 does not move within the holder 1.

Screw cap 10 is further unscrewed from holder 1 so that pouring opening 9 is left clear. During unscrewing of cap 10 the coupling element 11 is pulled upward so that valve 12 closes passage opening 7 and fingers 14 can spring back so that screw cap 10 can be uncoupled from coupling element 11.

As seen by comparing FIG. 1 to FIG. 3, the fingers 14 of the coupling element 11 resiliently engage the groove 15 of the cap 10 such that the cap 10 pulls the valve upward to close the passageway 7.

As can be further seen between FIG. 1 and FIG. 3, the housing 13 does not move within the holder 10 during normal dosing and dispensing operations of the holder 1.

Figure 4:
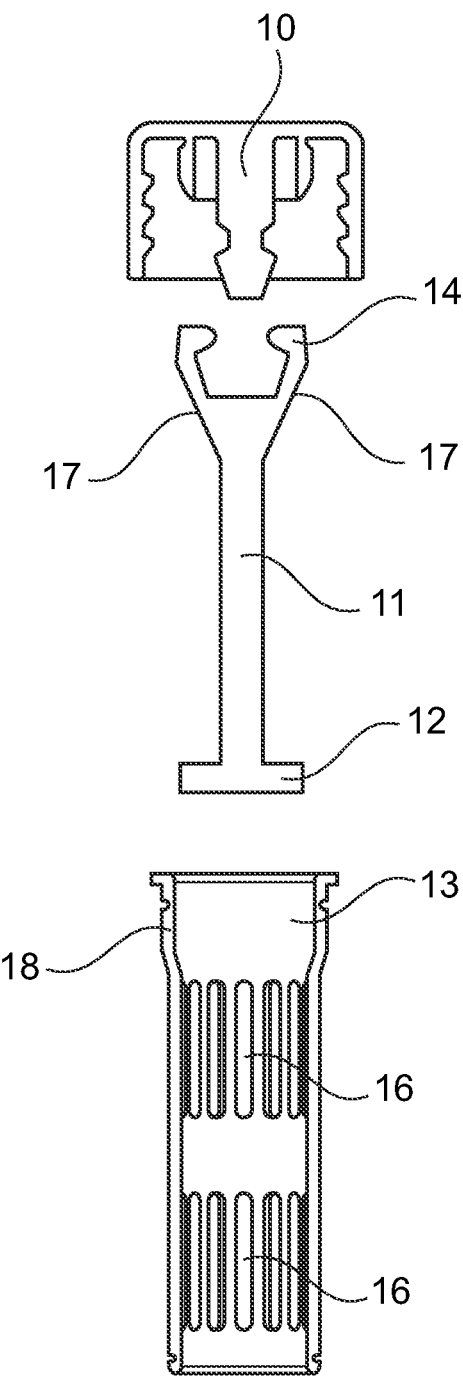
FIG. 4 shows the closure of the holder of FIG. 1 with exploded parts.

FIG. 4 shows the different parts of the closure of holder 1. These components are the cylindrical housing 13, the elongate coupling element 11 and screw cap 10.

Cylindrical housing 13 is perforated with holes 16 so that liquid can flow out freely from inside, and vice versa.

Provided on the elongate coupling element 11 are a number of fingers 14 which have an inclining surface 17 on the outer side. This inclining surface 17 co-acts with the narrowed portion 18 in the cylindrical housing in order to effect the coupling between screw cap 10 and coupling element 11.

Figure 5A:
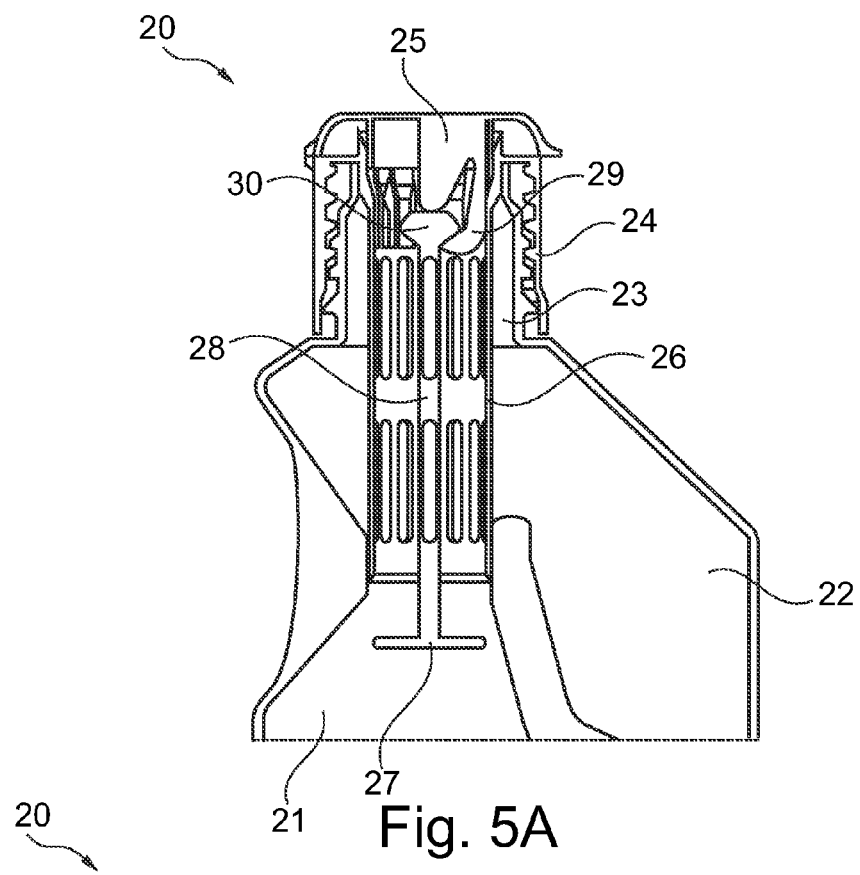
FIGS. 5A and 5B show a second embodiment of a holder according to the invention in two different positions.
Figure 5B:
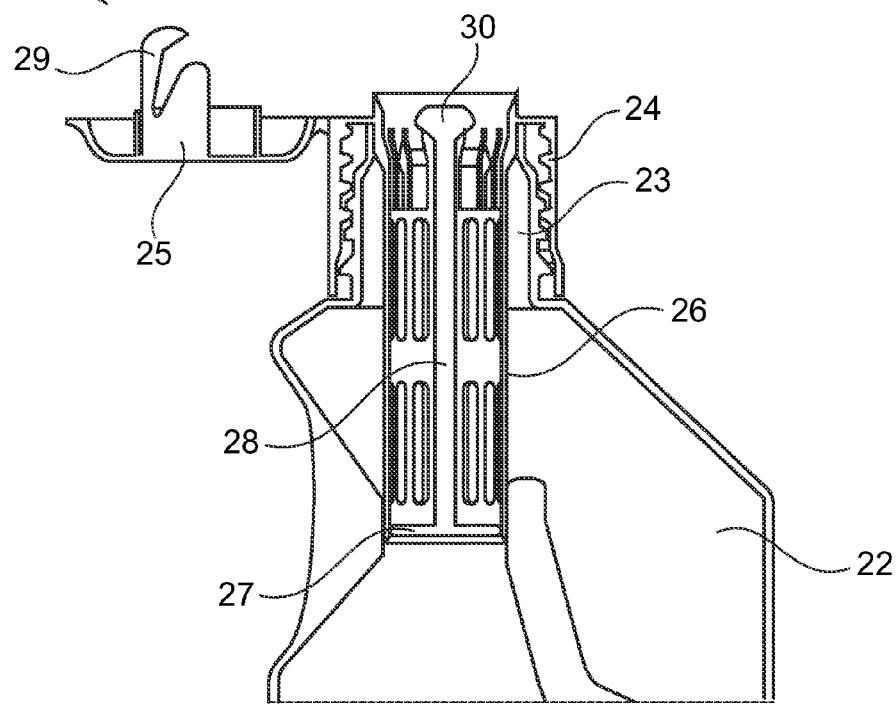

FIGS. 5A and 5B show a second embodiment 20 of the holder according to the invention. Holder 20 has a supply chamber 21 and a dosing chamber 22.

A closable pouring opening 23 is further provided on the upper side of dosing chamber 22. A cap 24 is screwed onto this pouring opening 23. This cap 24 has a pivoting cover part 25 with which pouring opening 23 can be easily opened.

A cylindrical housing 26 is arranged between pouring opening 23 and the passage opening between supply chamber 21 and dosing chamber 22. A valve 27 with valve stem 28 is guided in this housing 26. Valve 27 can close the underside of cylindrical housing 26, whereby the passage opening between supply chamber 21 and dosing chamber 22 is closed.

Provided on the underside of cover part 25 is a hook 29 which engages on the thickened upper side 30 of valve stem 28. In the closed situation (see FIG. 5A) hook 29 presses valve 27 downward, whereby the passage opening is opened and liquid can flow from supply chamber 21 to dosing chamber 22 as further elucidated with reference to FIGS. 2 and 3.

When cover part 25 is pivoted open, hook 29 will partially co-displace the thickened upper side 30, whereby valve 27 is pulled into housing 26 and the passage opening between supply chamber 21 and dosing chamber 22 is closed.

The invention claimed is:
1. A holder, for holding a liquid, the holder comprising:
 (a) a supply chamber with a bottom surface, a peripheral wall standing from the peripheral edge of the bottom surface and a closing upper surface, wherein a passage opening is arranged close to or in the upper surface;
 (b) a dosing chamber arranged on the passage opening of the supply chamber,
 extending at least partly below the level of the passage opening, wherein the dosing chamber further comprises a pouring opening for pouring the liquid out of the dosing chamber; and
 (c) a closure for closing either the pouring opening or the passage opening as desired, comprising a valve for closing the passage opening and a closing cap arranged on the pouring opening;
 wherein the closing cap is coupled to the valve;
 wherein the closure comprises a housing extending between the passage opening and the pouring opening, wherein the housing wall is perforated, and wherein the housing does not move within the holder during normal dosing and dispensing operations of the holder; and
 wherein the closure further comprises a coupling for effecting a coupling between the closing cap and the valve during sealing of the pouring opening with the closing cap, wherein a coupling element is attached to the valve;
 wherein the coupling comprises at least one finger extending from the coupling element and a cooperating groove within the closing cap, wherein the coupling may be disengaged such that the cap is not coupled to the valve;
 wherein in a first position, the cap is secured in the pouring opening and the valve is depressed by the cap such that the passage opening is open and the at least one finger engages with the cooperating groove to couple the cap and valve so that the movement of the cap from the first position will cause the cap to pull the valve upward; and wherein in a second position, the cap is removed from the pouring opening and the valve is positioned such that the passage opening is closed and the cap and valve are disengaged.

2. The holder as claimed in claim 1, wherein the dosing chamber extends on the outer side of the supply chamber along at least a part of the peripheral wall.

3. The holder as claimed in claim 1, wherein the dosing chamber is arranged eccentrically relative to the passage opening.

4. The holder as claimed in claim 1, wherein the cap is a screw cap.

5. The holder as claimed in claim 1, wherein the cap comprises a hingedly arranged cover.

6. The holder as claimed in claim 1, wherein the fingers are resiliently engaged with the cooperating groove.

\* \* \* \* \*